(12) United States Patent
Goldman et al.

(10) Patent No.: US 8,285,803 B2
(45) Date of Patent: Oct. 9, 2012

(54) SORTING ELECTRONIC MESSAGES USING ATTRIBUTES OF THE SENDER ADDRESS

(75) Inventors: Phillip Y. Goldman, Los Altos, CA (US); Richard A. Landsman, Scotts Valley, CA (US)

(73) Assignee: AOL Inc., Dulles, VA (US)

( * ) Notice: Subject to any disclaimer, the term of this patent is extended or adjusted under 35 U.S.C. 154(b) by 5 days.

(21) Appl. No.: 13/081,705

(22) Filed: Apr. 7, 2011

(65) Prior Publication Data

US 2011/0185028 A1    Jul. 28, 2011

Related U.S. Application Data

(63) Continuation of application No. 12/414,568, filed on Mar. 30, 2009, now Pat. No. 7,945,633, which is a continuation of application No. 11/842,792, filed on Aug. 21, 2007, now Pat. No. 7,617,286, which is a continuation of application No. 10/418,373, filed on Apr. 18, 2003, now Pat. No. 7,290,033.

(51) Int. Cl.
*G06F 15/16* (2006.01)

(52) U.S. Cl. ........................................................ 709/206

(58) Field of Classification Search .................. 709/203, 709/206, 207
See application file for complete search history.

(56) References Cited

U.S. PATENT DOCUMENTS

| | | |
|---|---|---|
| 4,977,520 A | 12/1990 | McGaughey, III et al. |
| 5,040,141 A | 8/1991 | Yazima et al. |
| 5,093,918 A | 3/1992 | Heyen et al. |
| 5,159,673 A | 10/1992 | Sackmann et al. |
| 5,204,961 A | 4/1993 | Barlow |
| 5,245,532 A | 9/1993 | Mourier |
| 5,283,856 A | 2/1994 | Gross et al. |
| 5,319,776 A | 6/1994 | Hile et al. |
| 5,333,266 A | 7/1994 | Boaz et al. |
| 5,377,354 A | 12/1994 | Scannell et al. |
| 5,423,042 A | 6/1995 | Jalili et al. |
| 5,448,734 A | 9/1995 | Hrabik et al. |

(Continued)

FOREIGN PATENT DOCUMENTS

DE    19708856    9/1998

(Continued)

OTHER PUBLICATIONS

Aguilar, Rose, AOL fights to ban junk, CNETNews.com, Sep. 6, 1996, 3 pages, http://www.news.com/News/Item/0.43106,00.html.

(Continued)

*Primary Examiner* — Frantz Jean
(74) *Attorney, Agent, or Firm* — Finnegan, Henderson, Farabow, Garrett & Dunner, LLP

(57) ABSTRACT

Systems and methods for sorting electronic messages using attributes of senders or of sender addresses. An electronic messaging server sorts electronic messages using attributes associated with the senders or sender addresses of the electronic messages. The sender addresses and associated attributes are stored in an accept list. A sorting module uses the accept list to sort the electronic messages into various folders. The sorting module can also access other data sources, such as a contact list, to assist in sorting the electronic messages. The attributes can be determined independently of the user or can be set directly by the user. The attributes can also identify a status of a sender such as whether the sender is authorized, unauthorized, or unconfirmed.

20 Claims, 3 Drawing Sheets

U.S. PATENT DOCUMENTS

| | | | |
|---|---|---|---|
| 5,471,519 A | 11/1995 | Howe et al. |
| 5,473,671 A | 12/1995 | Partridge, III |
| 5,539,828 A | 7/1996 | Davis |
| 5,548,789 A | 8/1996 | Nakanura |
| 5,600,799 A | 2/1997 | Young et al. |
| 5,604,803 A | 2/1997 | Aziz |
| 5,608,786 A | 3/1997 | Gordon |
| 5,619,648 A | 4/1997 | Canale et al. |
| 5,627,764 A | 5/1997 | Schutzman et al. |
| 5,630,123 A | 5/1997 | Hogge |
| 5,632,018 A | 5/1997 | Otorii |
| 5,655,079 A | 8/1997 | Hirasawa et al. |
| 5,721,779 A | 2/1998 | Funk |
| 5,734,903 A | 3/1998 | Saulpaugh et al. |
| 5,742,668 A | 4/1998 | Pepe et al. |
| 5,742,769 A | 4/1998 | Lee et al. |
| 5,781,857 A | 7/1998 | Hwang et al. |
| 5,796,840 A | 8/1998 | Davis |
| 5,826,022 A | 10/1998 | Nielsen |
| 5,832,227 A | 11/1998 | Anderson et al. |
| 5,835,722 A | 11/1998 | Bradshaw et al. |
| 5,859,967 A | 1/1999 | Kaufeld et al. |
| 5,884,033 A | 3/1999 | Duvall et al. |
| 5,893,911 A | 4/1999 | Piskiel et al. |
| 5,909,589 A | 6/1999 | Parker et al. |
| 5,917,489 A | 6/1999 | Thurlow et al. |
| 5,930,479 A | 7/1999 | Hall |
| 5,937,162 A | 8/1999 | Funk et al. |
| 5,999,600 A | 12/1999 | Shin |
| 5,999,932 A | 12/1999 | Paul |
| 5,999,967 A | 12/1999 | Sundsted |
| 6,014,634 A | 1/2000 | Scroggie et al. |
| 6,023,723 A | 2/2000 | McCormick et al. |
| 6,052,709 A | 4/2000 | Paul |
| 6,055,510 A | 4/2000 | Henrick et al. |
| 6,057,841 A | 5/2000 | Thurlow et al. |
| 6,073,142 A | 6/2000 | Geiger et al. |
| 6,092,101 A | 7/2000 | Birrell et al. |
| 6,112,227 A | 8/2000 | Heiner |
| 6,154,765 A | 11/2000 | Hart |
| 6,173,322 B1 | 1/2001 | Hu |
| 6,182,118 B1 | 1/2001 | Finney et al. |
| 6,189,026 B1 | 2/2001 | Birrell et al. |
| 6,195,698 B1 | 2/2001 | Lillibridge et al. |
| 6,199,102 B1 | 3/2001 | Cobb |
| 6,199,106 B1 | 3/2001 | Shaw et al. |
| 6,205,432 B1 | 3/2001 | Gabbard et al. |
| 6,226,372 B1 | 5/2001 | Beebe et al. |
| 6,230,188 B1 | 5/2001 | Marcus |
| 6,237,027 B1 | 5/2001 | Namekawa |
| 6,249,807 B1 | 6/2001 | Shaw et al. |
| 6,266,692 B1 | 7/2001 | Greenstein |
| 6,282,565 B1 | 8/2001 | Shaw et al. |
| 6,349,328 B1 | 2/2002 | Haneda et al. |
| 6,356,935 B1 | 3/2002 | Gibbs |
| 6,366,950 B1 | 4/2002 | Scheussler et al. |
| 6,373,950 B1 | 4/2002 | Rowney |
| 6,393,465 B2 | 5/2002 | Leeds |
| 6,421,709 B1 | 7/2002 | McCormick et al. |
| 6,457,044 B1 | 9/2002 | IwaZaki |
| 6,460,074 B1 | 10/2002 | Fishkin |
| 6,484,197 B1 | 11/2002 | Donohue |
| 6,546,416 B1 | 4/2003 | Kirsch |
| 6,587,550 B2 | 7/2003 | Council et al. |
| 6,625,257 B1 | 9/2003 | Asaoka et al. |
| 6,640,301 B1 | 10/2003 | Ng |
| 6,671,718 B1 | 12/2003 | Meister et al. |
| 6,678,704 B1 | 1/2004 | Bridge et al. |
| 6,691,156 B1 | 2/2004 | Drummond et al. |
| 6,708,205 B2 * | 3/2004 | Sheldon et al. ............... 709/206 |
| 6,748,422 B2 | 6/2004 | Morin et al. |
| 6,856,963 B1 | 2/2005 | Hurwitz |
| 6,868,498 B1 | 3/2005 | Katsikas |
| 6,880,088 B1 | 4/2005 | Gazier et al. |
| 6,883,095 B2 | 4/2005 | Sandhu et al. |
| 7,043,753 B2 | 5/2006 | Roddy et al. |
| 7,065,341 B2 | 6/2006 | Kamiyama et al. |
| 7,076,533 B1 | 7/2006 | Knox et al. |
| 7,085,925 B2 | 8/2006 | Hanna et al. |
| 7,120,927 B1 | 10/2006 | Beyda et al. |
| 7,136,897 B1 | 11/2006 | Raghunandan |
| 7,185,194 B2 | 2/2007 | Morikawa et al. |
| 7,185,359 B2 | 2/2007 | Schmidt et al. |
| 7,188,358 B1 | 3/2007 | Hisada et al. |
| 7,194,515 B2 | 3/2007 | Kirsch |
| 7,231,427 B1 | 6/2007 | Du |
| 7,263,545 B2 | 8/2007 | Digate et al. |
| 7,346,696 B2 | 3/2008 | Malik |
| 7,383,433 B2 | 6/2008 | Yeager et al. |
| 7,512,788 B2 | 3/2009 | Choi et al. |
| 2002/0042815 A1 | 4/2002 | Salzfass et al. |
| 2002/0046099 A1 | 4/2002 | Frengut et al. |
| 2002/0046250 A1 | 4/2002 | Nassiri |
| 2002/0099781 A1 | 7/2002 | Scheussler et al. |
| 2002/0107856 A1 | 8/2002 | Scheussler et al. |
| 2002/0147726 A1 | 10/2002 | Yehia et al. |
| 2002/0152272 A1 | 10/2002 | Yairi |
| 2002/0194308 A1 | 12/2002 | Hall |
| 2003/0009698 A1 | 1/2003 | Lindeman et al. |
| 2003/0030680 A1 | 2/2003 | Cofta et al. |
| 2003/0037103 A1 | 2/2003 | Salmi et al. |
| 2003/0037250 A1 | 2/2003 | Walker et al. |
| 2003/0065926 A1 | 4/2003 | Schultz et al. |
| 2003/0081621 A1 | 5/2003 | Godfrey et al. |
| 2003/0086543 A1 | 5/2003 | Raymond |
| 2003/0097597 A1 | 5/2003 | Lewis |
| 2003/0110400 A1 | 6/2003 | Cartmell et al. |
| 2003/0163691 A1 | 8/2003 | Johnson |
| 2003/0167402 A1 | 9/2003 | Stolfo et al. |
| 2003/0191969 A1 | 10/2003 | Katsikas |
| 2003/0196116 A1 | 10/2003 | Troutman |
| 2003/0200267 A1 | 10/2003 | Garrigues |
| 2003/0233418 A1 | 12/2003 | Goldman |
| 2003/0236847 A1 | 12/2003 | Benowitz et al. |
| 2004/0003283 A1 | 1/2004 | Goodman et al. |
| 2004/0015554 A1 | 1/2004 | Wilson |
| 2004/0054887 A1 | 3/2004 | Paulsen |
| 2004/0087300 A1 | 5/2004 | Lewis |
| 2004/0111480 A1 | 6/2004 | Yue |
| 2004/0143633 A1 | 7/2004 | McCarty |
| 2004/0148358 A1 * | 7/2004 | Singh et al. ................... 709/207 |
| 2004/0167941 A1 | 8/2004 | Prahlad et al. |
| 2004/0181581 A1 | 9/2004 | Kosco |
| 2004/0199595 A1 | 10/2004 | Banister et al. |
| 2004/0236835 A1 | 11/2004 | Blankenship |
| 2004/0236838 A1 | 11/2004 | Tout |
| 2004/0243676 A1 | 12/2004 | Blankenship |
| 2004/0243698 A1 | 12/2004 | Blankenship |
| 2005/0015481 A1 | 1/2005 | Blankenship |
| 2005/0015482 A1 | 1/2005 | Blankenship |
| 2005/0076220 A1 | 4/2005 | Zhang et al. |
| 2005/0076221 A1 | 4/2005 | Olkin et al. |
| 2005/0076222 A1 | 4/2005 | Olkin et al. |
| 2005/0081059 A1 | 4/2005 | Bandini et al. |
| 2005/0188045 A1 | 8/2005 | Katsikas |
| 2006/0059238 A1 | 3/2006 | Slater et al. |
| 2006/0101021 A1 | 5/2006 | Davis et al. |
| 2006/0112165 A9 | 5/2006 | Tomkow et al. |
| 2007/0016641 A1 | 1/2007 | Broomhall |
| 2008/0162926 A1 | 7/2008 | Xiong et al. |

FOREIGN PATENT DOCUMENTS

| | | |
|---|---|---|
| EP | 0 463 252 B1 | 1/1992 |
| EP | 0 651 533 A2 | 5/1995 |
| EP | 0 686 327 B1 | 12/1995 |
| EP | 0 721 268 A2 | 7/1996 |
| EP | 0 725 523 A2 | 8/1996 |
| EP | 0 760 565 B1 | 3/1997 |
| EP | 0 883 271 | 12/1998 |
| WO | WO 94/06236 | 3/1994 |
| WO | WO 96/24213 | 3/1996 |
| WO | WO 96/24213 | 8/1996 |
| WO | WO 97/14234 | 4/1997 |
| WO | WO 97/20423 | 6/1997 |
| WO | WO 97/23082 | 6/1997 |
| WO | WO 97/24825 | 7/1997 |
| WO | WO 97/26709 | 7/1997 |

| WO | WO 01/16695 | 3/1998 |
| WO | WO 98/37675 | 8/1998 |
| WO | WO 99/10817 | 3/1999 |
| WO | WO 02/077768 | 10/2002 |
| WO | WO 03/044617 | 5/2003 |

OTHER PUBLICATIONS

Andrew Leonard, SpamBomers, Sep. 1997,7 pages, Salon Magazine + about 21st + newsletter.
Bob Tiptrie, A Way to Stop Spam Messages, online, retrieved Apr. 25, 2003, 4 pages, retrieved from the internet http://groups.google.com/groups.
Cementing Online Partnerships and Improving User Experience, RSA Security, retrived online May 17, 2006,7 pages, www.rsasecurity.com.
Chinese Abstract for CN 1117680, published Feb. 28, 1996.
CNET News.com staff, ISP: Internet Spam Provider, Feb. 18, 1997,2 pages, CNET News.com.
Cole-Gomolski, Barb, Adoption of S/MIME still lagging, May 11, 1998, 4 pages, http://www.computerworld.com/home/features.nsf/.
Controlling E-Mail Spam, online, retrieved on Mar. 28, 2003, 5 pages, retrieved from the Internet http://spam.abuse.net/adminhelp/mail.shtml.
Cynthia Dwork et al., Pricing via Processing or Combatting Junk Mail, Jul. 2002, 12 pages, Technical Report CS95-20, Matematics & Computer Science, Weizmann Institute of Science.
Cynthia Dwork, Fighting Spam May be Easier Than You Think, 1992, 30 pages, presentation given in Crypto.
Cynthia Dwork, Fighting Spam: The Science, 2004, pp. 3-4, M. Farach-Colton (Ed.): Latin 2004, LNCS 2976, Springer-Verlag Berlin.
D.J. Berstein, Variable Envelope Return Paths, Feb. 1, 1997, 2 pages, http://cr.yp.to/proto/verp.txt.
David A. Wheeler, Countering Spam with Ham-Authenticated Email and the Guarded Email Protocol, Draft: First version Dec. 8, 2002; Released Apr. 2, 2003, 28 pages, dwheeler@dwheeler.com.
David F. Skoll, How to make SURE a human is sending you mail (was Re: Random e-mails), Nov. 15, 2006, 2 pages, news.admin.net-abuse.usenet, http://groups.google.com/group/news.admin.net-abuse.usenet/msg/e601783e8f40c54?d.
Dealing with Unsolicited Commercial Email (UCE, "email spam"), 2005 Public Access Networks Corporation, online, retrieved on Jun. 6, 2006, 3 pages, retrieved from the Internet http://www.panix.com/uce.html, Copyright 2003.
Douglas G. Henke, All Hail Emperor Lewis?, online, Feb. 20, 1997,2 pages, retrieved Apr. 25, 2003, retrived from the internet http://groups.google.com/groups.
Ed Foster, The Gripe Line Threatening legal action may be the quickeest way off a junk e-mailer's list, Info World Info Quote, Sep. 9, 1996,2 pages, vol. 18, Issue 37, http://www.infoworld.com/egi-bin/siplayArchives.pl?.
Foiling Spam with an Email Password System, online, retrieved on Jun. 28, 2004, 10 pages, retrieved from the Internet, http://www.uwasa.fi/-ts/info/spamfoil.html.
J. Klensin et al., IMA/POP Authorize Extension for Simple Challenge/Response, Sep. 1997, 5 pages.
Jameson, Bob, Filter for mail not addressed to you, Jesse Berst's Anchor Desk, Sep. 6, 1996, 3 pages, http://www.news.com/News/Item/0.43106,00.html.
Janet Kornblum, Programmer Writes Spam Bomb, Aug. 6,1997,2 pp., CNET News.com.
Julian Byrne, My Spamblock; Was: Thwarting UCE Address Culling Programs, online, Jan. 19, 1997,2 pages, retrieved Apr. 28, 2003, retrieved from the internet http://google.com/groups.
Julian Byrne, New Improved Ezspam! Was: My Spamblock . . . , online, Jan. 28,1997,4 pages, retrieved Apr. 25, 2003, retrived from the internet, http://groups.google.com/groups.
Lorrie Faith Crano et al, Spam!, Aug. 1998, pp. 74-83, Communications of the ACM, vol. 41, No. 8.
MailCircuit's Email HandShake Verification and Spam Filter Process, online, copyright 1996-2003, 2 pages, MailCircuit.com, retrieved from the Internet http://www.mailcircuit.com/filter.htm.
Michael's Stop Junk E-Mail, Stop Junk E-mail, Nov. 17, 1996, 2 pages, http:/www.crl.com/michaelp/stopjunkmail.html.
Mihir Bellare et al., Does Parallel Repetition Lower the Error in Computationally Sound Protocols?, 1997,24 pages, Proceedings of the 38th Symposium on Foundations of Computer Science, IEEE.
MIT LCS, Applied Security Reading Group, by Email Sit and Kevin Fu, 2 pages, updated May OS, 2003 on the Internet http://www.pdocs.lcs.mit.edu/asrg/.
Noni Naor, Verification of a Human in the Loop or Identification via the Turing Test, Sep. 1996, Cited in All On-Line Papers.
P. Resnick, RFC 28822, Apr. 2001, 51 pages, Qualcom Incorporated, http:rfc.net/rfc2822.html.
Paul Hoffman et al., Unsolicited Bulk Email: Mechanisms for Control, Internet Mail Consortium Report UBE-SOL, IMCR-2008, revised May 4, 1998,16 pages.
Paul Hoffman et al., Unsolicited Bulk Email: Mechanisms for Control, Internet Mail Consortium Report UBE-SOL, IMCR-005, Oct. 13, 1997, 31 pages.
Public Access Networks Corporation, Responding to Unsolicited Commercial Email (UCE, "email spam"), Feb. 25, 1997, 5 pages, http:www.panix.com/uce.html.
Ronald F. Guilmette, To Mung or Not to Mung, online, Jul. 24, 1997,2 pages, retrieved Apr. 25, 2003, retrieved from the internet http://groups.google.com/groups.
Showing Full Headers of a Message, Nov. 6, 1998, 3 pages, http:/www.panix.com/headers.html.
The Penny Black Project, online, retrieved on May 8, 2006, 2 pp., retrieved from the Internet http://research.microsoft.com/research/sv/PennyBlack.
Tim Richardson, Simple Notes on Internet Security and Email, Jun. 28, 1999, 2 pages, http:/www.timrichardson.net/security.html.

* cited by examiner

FIG. 3A

| ACCEPT LIST 18 | | | | | | |
|---|---|---|---|---|---|---|
| SENDER ADDRESS | ATTRIBUTES | | | | | |
| | AUTHORIZED | UNAUTHORIZED | UNCONFIRMED | WORKGROUP A | WORKGROUP B | SUBJECT |
| 57 | 71 | 72 | 73 | 74 | 75 | 76 |

| 300 | | | |
|---|---|---|---|
| SENDER ADDRESS | ATTRIBUTES | | |
| | USER ADDED | SENT MESSAGE | CHALLENGE / RESPONSE |
| 57 | 242 | 244 | 246 |

SORTING ELECTRONIC MESSAGES USING ATTRIBUTES OF THE SENDER ADDRESS

CROSS-REFERENCE TO RELATED APPLICATIONS

This application is a continuation of U.S. patent application Ser. No. 12/414,568, file Mar. 30,2009, now U.S. Pat. No. 7,945,633, which is a continuation of U.S. patent application Ser. No. 11/842,792, filed Aug. 21, 2007, now U.S. Pat. No. 7,617,286, which is a continuation of U.S. patent application Ser. No. 10/418,373, filed Apr. 18, 2003, issued Oct. 30, 2007, now U.S. Pat. No. 7,290,033, all of which applications are incorporated herein by reference in their entireties.

BACKGROUND OF THE INVENTION

1. The Field of the Invention

The present invention relates generally to sorting electronic messages. More specifically, the present invention relates to systems and methods for sorting incoming electronic messages using attributes associated with the sender, the sender address, and/or other characteristics of the electronic message.

2. Background and Relevant Art

Today, businesses and individuals are communicating using electronic messages such as emails, instant messages and voice messages. Communicating in this manner is convenient because the electronic messages are delivered relatively quickly to the recipient. Electronic messages enable individuals and businesses to carry on conversations, transact business, etc., at minimal cost. The ease by which a person is able to send and receive electronic messages thus makes this form of communication extremely attractive.

As a person or business begins to send and receive electronic messages, it quickly becomes clear that the electronic messages need to be sorted. The need to sort electronic messages, which often applies to both the electronic messages that are sent as well as to the electronic messages that are received, arises for a variety of reasons. First, many users have many different correspondents and these users can potentially receive hundreds of electronic messages over a short period of time. If a particular user is away from his or her computer for an extended period of time, sorting through unread messages can become a time consuming task. In fact, a user that does not check his or her email for a week or even a day is often faced with this problem. Thus, many users spend significant time sorting through the electronic messages that they have received.

The need to sort electronic messages is further complicated by unsolicited electronic messages. Unsolicited electronic messages typically include commercial advertisements and political messaging, but may also include offensive solicitations such as pornographic solicitations. Generally, users deal with both solicited and unsolicited messages on a daily basis. While many users tolerate sorting through solicited electronic messages, sorting through unsolicited electronic messages can be annoying and is a waste of valuable time.

Today, electronic messaging programs provide some sorting capabilities. Many of these methods, however, are dependent on actions of the user with respect to the electronic messaging program. The use of filter words, for example, to automate the process of sorting the electronic messages, is primarily applied to unsolicited electronic messages. In this case, a user enters certain words into a filtering system. When an electronic message having those certain words in the subject line or body of the message is received, the message can automatically be routed to a particular folder. This method requires a recipient to manually enter all of the filter words, specify which areas of the message are to be examined (i.e. the subject line, the body, etc.) and then direct the system where to send the messages. A clear disadvantage of this method is that an electronic message can be easily placed in the wrong folder when an electronic message unexpectedly contains a filter term. When an electronic message is sent to the wrong folder, for example, the electronic message may be inadvertently deleted or the electronic message may not be read in a timely manner.

Some users sort their electronic messages manually. One of the problems faced by users in this situation is that the users are faced with the task of sorting through all of their electronic messages in order to identify and move certain electronic messages. In addition, some users may want to have a particular electronic message in more than one folder. When the electronic messages are sorted manually, those users are required to copy and paste the electronic message into each folder. Other users set up various rules that are applied to each electronic message. These rules are not related to persistent sender/sender addresses, but are typically applied to each electronic message to determine if the rule should apply. This can be computationally expensive.

Conventional techniques for sorting incoming electronic messages are dependent on the user and can often be cumbersome and difficult to manage. Because users receive increasing numbers of solicited and unsolicited electronic messages, there is a need to manage and sort electronic messages more effectively without having to apply a set of rules to each separate electronic message.

BRIEF SUMMARY OF THE INVENTION

These and other limitations are overcome by the present invention which relates generally to sorting electronic messages. The present invention further relates to systems and methods for sorting electronic messages using attributes associated with the sender, the sender address, and/or other aspects of the electronic message. One advantage of the present invention is that sorting the electronic messages is related to persistent senders and/or sender addresses. Thus, an electronic message can be sorted using attributes of a sender or sender address rather than applying a set of rules to each electronic message. In one embodiment, electronic messages are sorted using an accept list that stores sender addresses and the attributes of the sender addresses. The present invention can also be applied to instant messaging and other forms of addressable electronic messages including, but not limited to, voice mail messaging systems.

In one embodiment of the present invention, an accept list is created that stores sender addresses. Each sender address is associated with one or more attributes that are used to sort the electronic messages. The accept list, for example, includes attributes that identify whether a particular sender is authorized, unauthorized, or unconfirmed. The attributes also identify whether a particular sender has successfully responded to a challenge sent by the user's electronic message server. The attributes can also identify how a sender was included in the accept list. Other attributes can also be included in the accept list.

When an electronic message is received at an electronic message server, a sorting module sorts the electronic messages into particular folders using the attributes of the sender that are included in the accept list. If a sender or sender address is not included in the accept list, then the electronic message may still sorted based on that fact. In one embodiment, the sender is entered in the accept list and assigned default attributes that are used to sort the electronic message.

One advantage of the present invention is that each electronic message does not have to be processed with rules that may or may not apply to the electronic message. In the present invention, attributes are associated with sender addresses. Because the sender address is immediately known from the electronic message, the electronic message can be sorted using the attributes associated with the electronic message without first determining which rules apply to the electronic message.

The accept list, which stores sender addresses and their associated attributes, becomes a central data structure for an electronic messaging system that can provide stronger sorting capabilities. A sorting module can access not only the accept list to sort electronic messages, but can also take advantage of a user's contact list or other data structures to sort the electronic messages. In addition, the present invention can utilize a challenge/response to assist in automatically setting attributes in the accept list and in sorting the electronic messages. In this manner, electronic messages can be sorted without direct input from the user in one embodiment.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A illustrates an accept list that associates attributes with a sender address;

FIG. 3B illustrates additional source attributes that indicate how a sender address was included in the accept list and that are associated with a sender address.

DETAILED DESCRIPTION OF THE PREFERRED EMBODIMENTS

The present invention relates to systems and methods for managing electronic messages. More particularly, the present invention relates to sorting electronic messages using attributes associated with the electronic message, the sender, and/or the sender address. The term "electronic messaging" includes any form of sending a message electronically including, but not limited to, via electronic mail (email), instant messaging, voice messaging, telephonic messaging, and other forms of electronic communication that involve the use of a sender address and a recipient or user address. An electronic message includes, but is not limited to, emails, instant messages, attachments, voice mails, and the like or any combination thereof.

The following overview of electronic messaging is described in the context of email sent over the Internet. The term "unsolicited" as it relates to the invention refers to any electronic message that is not desired or wanted by the user. "Solicited" electronic messages refer to any electronic message that is desired or wanted by the user. Electronic messages from senders of bulk electronic messages can be solicited and/or unsolicited. Unsolicited electronic messages are typically sent from senders that are unauthorized.

Figure 1:
FIG. 1 is a block diagram illustrating a generalized network through which an electronic message is transmitted from a sender computer to a user computer.

FIG. 1 is a block diagram that illustrates an exemplary system for sending and delivering electronic messages over a computer network such as the Internet. In FIG. 1, a sender computer 10 sends an electronic message to a user computer 12. The electronic message is routed through one or more simple mail transfer protocol (SMTP) servers 14 before arriving at the electronic messaging server 15 associated with user computer 12. The electronic messaging server 15 may be a server residing on a local area network with user computer 12, a server that user computer 12 accesses via a modem pool or with another Internet connection, a web server that provides web-based electronic messaging services to user computer 12, or a server that operates with user computer 12 in any of a variety of other network configurations. The electronic messaging server 15 also represents a server or a system of servers that provide electronic messaging services to various user computers that are geographically dispersed. The present invention can be implemented on the electronic messaging server 15 or collapsed onto the user computer 12. When the present invention is implemented on the electronic messaging server 15, electronic messages are sorted for the users that subscribe or receive electronic messages through the electronic messaging server 15.

Figure 2:
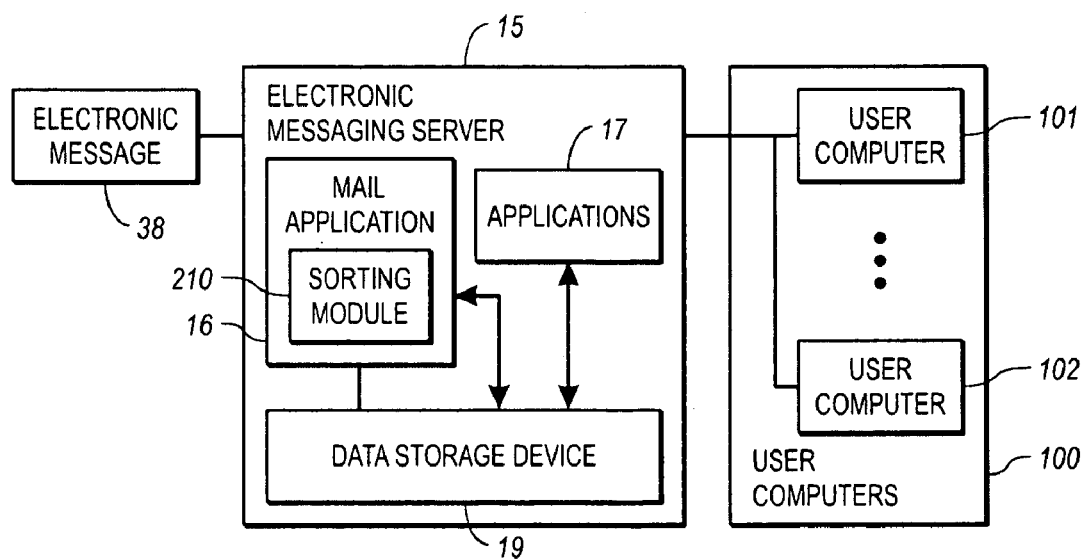
FIG. 2 is a block diagram depicting a generalized electronic messaging server that provides electronic messaging services including sorting services to various users.

FIG. 2 illustrates an electronic messaging server 15 that provides electronic messaging services to the user computers 100, which are represented by the user computer 101 and the user computer 102. The electronic messaging server 15 has a mail application 16 that includes a sorting module 210 for sorting electronic messages. The mail application 16 operates for each of the user computers 100. The electronic messaging server 15 may also include other applications 17, such as a calendaring program, a contacts program, and the like. The mail application 16 is often integrated with the applications 17. The data storage device 19 may store data used by mail application 16 and applications 17.

In an alternative embodiment, the functionality of the mail application 16 and the sorting module 210 can be collapsed onto the user computers. If the user computer 101 is used by more than one person, the sorting module 210 of the mail application 16 also has the ability to sort electronic messages for all users of the user computer 101.

When an electronic message 38 arrives at the electronic messaging server 15, the mail application 16 processes the electronic message and the sorting module 210 sorts the electronic message 38. In one embodiment, the sorting module 210 uses an accept list that can be implemented on the electronic messaging server 15 or on the user computers 100. The accept list is usually a data structure that includes an entry for each sender address. In one embodiment, an accept list is maintained for each user computer. Each sender address in an accept list has various attributes that are used to sort electronic messages. In one embodiment, these attributes can be determined without direct input from the user while other attributes can be directly set by the user.

One advantage of having an accept list is that sorting electronic messages is related to sender addresses that are persistently stored by the electronic messaging server 15. When an electronic message 38 is received by the electronic messaging server 15, the attributes used to sort the electronic message can be immediately identified from the sender address of the electronic message. In contrast, a rule based system typically applies each rule to the electronic message in order to determine which rules apply. Thus, each electronic message is analyzed with respect to each rule, regardless of whether the rule actually applies to the electronic message. This inefficiency is overcome by the present invention because the attributes used to sort an electronic message are known from the sender address.

FIG. 3A illustrates an exemplary embodiment of an accept list 18. In this example, the accept list 18 is a data structure that includes sender addresses and the attributes that are associated with each sender address. The accept list 18 thus includes a sender address field 57 that stores sender addresses. The attributes 70 of the sender addresses include, but are not limited to, an authorized attributed 71, an unauthorized attribute 72, an unconfirmed attribute 73, a workgroup attribute (illustrated in this embodiment as workgroup A 74 and workgroup B 75), and a subject attribute 76. One of skill in the art can appreciate that other attributes can also be included in the accept list.

The authorized attribute 71, the unauthorized attribute 72 and the unconfirmed attribute 73 relate to whether a sender is permitted to send electronic messages to the user. The authorized attribute 71 of the sender address indicates that the sender is permitted to send electronic messages to the user and that electronic messages from that sender are not deleted or discarded. The unauthorized attribute 71 of the sender address indicates that the sender is not permitted to send electronic messages to the user and electronic messages from senders whose unauthorized attribute is set are not delivered to the user and may be are deleted or stored in an unauthorized folder for later handling by the user.

The unconfirmed attribute 73 indicates that the sender is neither authorized or unauthorized. This may occur, for example, when an electronic message is received from a previously unknown sender. Electronic messages from an unconfirmed sender may be stored, for example, in a temporary folder. The user can voluntarily access this folder and access these electronic messages. Alternatively, these electronic messages are further sorted when the associated senders become either authorized or unauthorized senders of electronic messages.

FIG. 3B illustrates additional attributes that may be included in the accept list 18. The attributes in FIG. 3B describe how a sender address was entered in the accept list 18 and are referred to herein as source attributes. These are examples of attributes that can be used to prioritize electronic messages as the electronic messages are sorted, although the attributes illustrated in FIG. 3A can also be used to prioritize the electronic messages. For example, an electronic message from a sender that is explicitly authorized by the user may have a higher priority than electronic messages from senders that were not explicitly authorized.

Thus, a sender can become authorized or unauthorized in various manners and the attributes illustrated in FIG. 3B describe a status of a particular sender as well as how a particular sender became either authorized or unauthorized. The user added attribute 242 indicates that, for example, a sender address 302 was explicitly added by the user to the accept list 18. The user added attribute 242 can therefore include sender addresses of senders that have not previously sent an electronic message to the user. The sent message attribute 244 indicates that the sender associated with the sender address 304 is authorized because the user sent an electronic message to that sender. By sending an electronic message to a sender, the user implies that the sender is an authorized sender and the sent message attribute 244 is set. In these example, the authorized attribute 71 of the corresponding senders is also set for authorized senders.

The challenge/response attribute 246 indicates the status of a sender with respect to a challenge that was sent to the sender. For instance, when a sender sends an electronic message to the user and the sender is neither an authorized sender nor an unauthorized sender, a challenge is sent to the sender by the electronic messaging server. At this point, the sender becomes an unconfirmed sender and the unconfirmed attribute of the sender is set in the accept list 18. The sender is typically required to successfully respond to the challenge before the electronic message from the sender is delivered to the user. However, electronic messages from an unconfirmed sender may be delivered until the sender becomes unauthorized, which occurs if the sender does not successfully respond to the challenge. If the sender becomes an unauthorized sender, subsequent electronic messages are not delivered to the user.

The challenge, in one example, is an electronic message sent to the sender that includes a link to a web site. At the web site, the sender is required to enter a confirmation code in an text entry box provided at the web site. The confirmation code may be visible to the sender at the web site when the sender accesses the web site or may be included in the challenge. For example, a graphic that displays a alphanumerical code may be visible to a user at the web site. The user is required to enter the alphanumerical code in an entry box. Because the alphanumerical code is represented graphically, the code can typically only be entered by a person and cannot be entered automatically by a computer. Alternatively, the sender may be required to answer a question at the web site to successfully respond to the challenge. Only senders that successfully respond to the challenge can become authorized senders and have the authorized attribute set for their sender address. The challenge/response attribute 246 indicates whether the response was correct, whether the response was timely, and the like. The challenge/response attribute 246 can be related to the authorized attribute 71, the unauthorized attribute 72, and the unconfirmed attribute 73 in one embodiment.

The challenge issued by the mail application 16 is particularly useful against senders of unsolicited electronic messages. The challenge issued by the electronic messaging server is configured to permit a person to enter the correct response or confirmation code while preventing the correct response from being provided by a computer. Senders of unsolicited electronic messages typically generate automatic responses or no response at all and thereby become unauthorized senders because they fail to provide a correct response to the challenge.

In one embodiment of the accept list 18, the attributes associated with a sender address can be established without direct input from the user. These attributes, even though they can be set independent of the user, can be changed or set by the user as well. For example, a sender can become an authorized sender by successfully responding to the challenge. A user, however, can set the unauthorized attribute of a sender even though the sender successfully responded to the challenge unsuccessfully.

The attributes of the sender addresses in the accept list 18 can further include attributes that are determined by the user. The workgroup attributes 74, 75, and the subject attribute 76 can be set by the user. The workgroup attributes are useful, for example, for directing electronic messages associated with particular workgroups. The workgroup attributes may indicate whether the sender is a partner, vendor, team-member, or other employee. These attributes can be used to sort electronic messages.

For example, an employee of a company may receive 200 electronic messages a day in the employee's inbox from authorized senders within the employee's company. The employee may also receive 50 electronic messages from authorized senders outside of the company. Using the accept list, the electronic messaging server can organize the electronic messages using the attributes associated with the senders of the electronic messages. The electronic messages may be sorted into folders based on the workgroup attributes, for example, or by other attributes in the accept list. Similarly, the subject attribute 76 may used to sort electronic messages using the subject line of the electronic messages.

Figure 4:
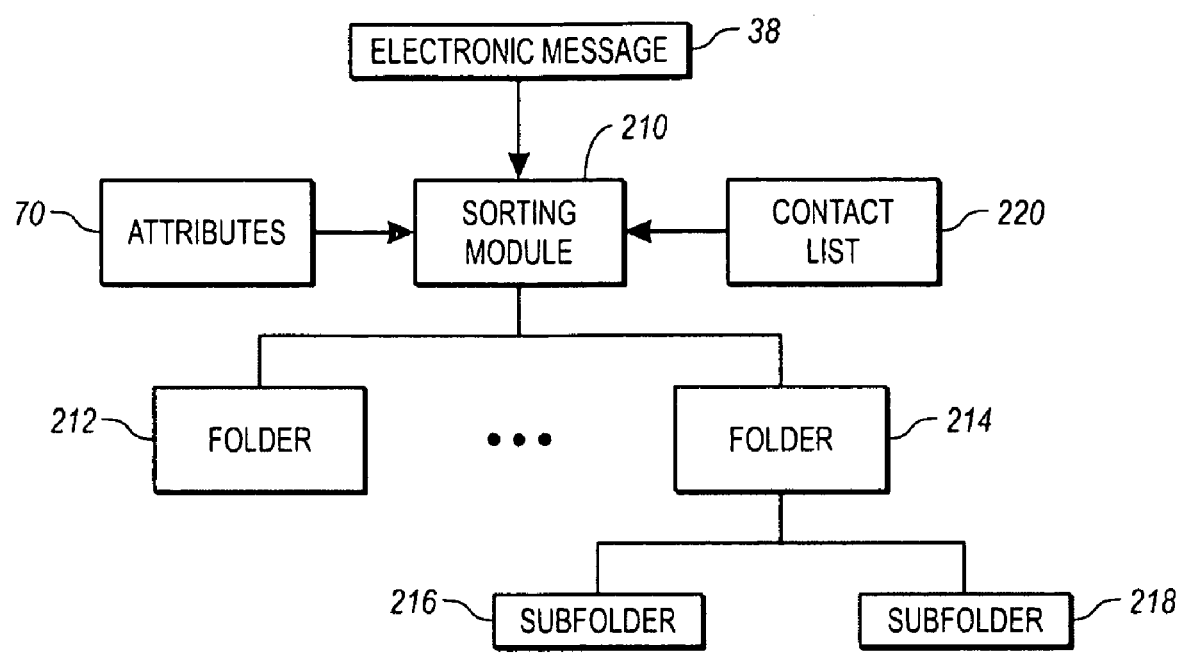
FIG. 4 is a block diagram illustrating an electronic message that is sorted by a sorting module that uses the attributes associated with a sender address and/or a contact list of the intended recipient.

FIG. 4 illustrates an example of how an electronic message is sorted using attributes associated with the sender, sender address or other characteristic of the electronic message. In this example, an electronic message 38 has been received by an electronic messaging server and the attributes 70 have been accessed from the accept list based on the sender address of the electronic message 38. The sorting module 210 applies the attributes 70 to sort or route the electronic message to the appropriate folder(s) or location(s). The sorting module 210 can route the electronic message to a particular folder 212 (such as an inbox) or to more than one folder such as to the folder 212 and the folder 214. The sorting module 210 can also route an electronic message to a subfolder 216. The folder 214, for example, may be a temporary folder where electronic messages from unauthorized senders are sent. Alternatively, the folder 214 may be a work folder where electronic messages from coworkers in the same workgroup are placed.

The combination of attributes can determine where an electronic message is stored. For example, electronic messages can be given a high priority and stored in a priority folder. Electronic messages from senders that were explicitly entered in the accept list by the user may be given a higher priority that other electronic messages and placed in a particular folder. Electronic messages from authorized senders may be sent to the inbox folder while electronic messages from unconfirmed senders are held in a temporary folder until the senders are either authorized or unauthorized.

In another example, a user may subscribe to several newsletters, purchase goods on the Internet, and correspond with family members. The user thus receives electronic messages from each of these entities. In this example, all of the senders are authorized senders as the user desires to receive electronic messages sent by these entities. These senders also have other attributes that enable the sorting module to deliver electronic messages to corresponding folders. Family members, for example, may have a personal-private attribute that causes electronic messages from family members to be delivered to a family folder. Internet merchants may use a combination of a merchant attribute and an authorized sender attribute to deliver electronic messages to a merchant folder.

The sorting module 210 may also utilize a contact list 220 to sort the electronic messages. For example, all contacts in the users contact list 220 can be deemed authorized senders and may be included in the accept list. When a contact is deleted, the contact simultaneously becomes an unauthorized sender or an unconfirmed sender and the corresponding attribute is set. The electronic messaging server has the ability to scan the contact list automatically and make adjustments to the accept list based on the content of the contact list 220.

The accept list 18 can also be used to associate attributes with domain names in addition to sender addresses. Electronic messages from senders in a particular domain can thus be sorted using the attributes associated with the domain. The accept list 18 may also be updated or refreshed periodically. This may give, for example, an unauthorized sender another opportunity to become an authorized sender. Alternatively, an authorized sender may also be required to again confirm that they are an authorized sender. This can be achieved in one embodiment by issuing a new challenge to the sender.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer-implemented method for electronic communications, comprising:
    determining whether an electronic communication was previously sent to a sender;
    adding the sender to a list of authorized senders if it is determined that an electronic communication was previously sent to the sender;
    receiving an electronic communication from the sender;
    determining whether the sender is included in the list of authorized senders; and
    automatically associating the received electronic communication with an authorized sender folder if the sender is determined to be included in the list of authorized senders.

2. The computer-implemented method of claim 1, further comprising:
    accessing a list of unauthorized senders;
    determining that the sender is included in the list of unauthorized senders; and
    determining not to deliver the received electronic communication if the sender is determined to be included in the list of unauthorized senders.

3. The computer-implemented method of claim 1, further comprising:
    determining that the sender is neither an authorized sender nor an unauthorized sender;
    sending a challenge to the sender;
    receiving a response to the challenge from the sender;
    determining whether the sender correctly responded to the challenge;
    forwarding the received electronic communication if it is determined that the sender correctly responded to the challenge.

4. The computer-implemented method of claim 3, further comprising adding the sender to the list of authorized senders if it is determined that the sender correctly responded to the challenge.

5. The computer-implemented method of claim 1, further comprising:
    sending a challenge to the sender;
    receiving a response to the challenge from the sender;
    determining whether the sender correctly responded to the challenge;
    determining not to forward the received electronic communication if it is determined that the sender did not correctly respond to the challenge.

6. The computer-implemented method of claim 5, further comprising adding the sender to a list of unauthorized senders if it is determined that the sender did not correctly respond to the challenge.

7. The computer-implemented method of claim 1, further comprising:
    determining a priority level of the received electronic communication; and
    automatically associating the received electronic communication with a folder based on the determined priority level.

8. The computer-implemented method of claim 1, further comprising:
    determining that an electronic communication was not previously sent to the sender;
    determining whether the sender is included in a list of unknown senders; and
    automatically associating the received electronic communication with a temporary folder if the sender is determined to be included in the list of unknown senders.

9. The computer-implemented method of claim 1, further comprising:
    automatically associating the received electronic communication with an authorized sender subfolder if the sender is determined to be included in the list of authorized senders.

10. The computer-implemented method of claim 1, further comprising:
    automatically associating the received electronic communication with an unknown sender subfolder if the sender is not determined to be included in the list of authorized senders.

11. A computer-based system for electronic communications comprising one or more processors and one or more storage media storing a plurality of instructions, the plurality of instructions being executable by at least one processor for:
    determining whether a user has previously sent an electronic communication to a sender;
    adding the sender to a list of authorized senders if the user is determined to have previously sent an electronic communication to the sender;
    receiving an electronic communication sent from the sender to the user;
    determining whether the sender is included in the list of authorized senders; and
    automatically associating the received electronic communication with an authorized sender folder that is associated with the user if the sender is determined to be included in the list of authorized senders.

12. The system of claim 11, further comprising instructions executable by the at least one processor for:
    accessing a list of unauthorized senders;
    determining that the sender is included in the list of unauthorized senders; and
    determining, if the sender is included in the list of unauthorized senders, not to deliver the received electronic communication to the user.

13. The system of claim 11, further comprising instructions executable by the at least one processor for:
    determining that the sender is neither an authorized sender nor an unauthorized sender;
    sending a challenge to the sender;
    receiving a response to the challenge from the sender;
    determining whether the sender correctly responded to the challenge; and sending the received electronic communication to the user if it is determined that the sender correctly responded to the challenge.

14. The system of claim 13, further comprising instructions executable by the at least one processor for adding the sender to the list of authorized senders if it is determined that the sender correctly responded to the challenge.

15. The system of claim 11, further comprising instructions executable by the at least one processor for:
   sending a challenge to the sender;
   receiving a response to the challenge from the sender;
   determining whether the sender correctly responded to the challenge; and
   determining not to send the received electronic communication to the user if it is determined that the sender did not correctly respond to the challenge.

16. The system of claim 15, further comprising instructions executable by the at least one processor for adding the sender to a list of unauthorized senders if it is determined that the sender did not correctly respond to the challenge.

17. The system of claim 11, further comprising instructions executable by the at least one processor for:
   determining a priority level of the received electronic communication; and
   automatically associating the received electronic communication with a folder based on the determined priority level.

18. The system of claim 11, further comprising instructions executable by the at least one processor for:
   determining that the user has not previously sent an electronic communication to the sender;
   determining whether the sender is included in a list of unknown senders; and
   automatically associating the received electronic communication with a temporary folder for the user if the sender is determined to be included in the list of unknown senders.

19. The system of claim 11, further comprising instructions executable by the at least one processor for:
   automatically associating the received electronic communication with an authorized sender subfolder for the user if the sender is determined to be included in the list of authorized senders.

20. The system of claim 11, further comprising instructions executable by the at least one processor for:
   automatically associating the received electronic communication with an unknown sender subfolder for the user if the sender is not determined to be included in the list of authorized senders.

* * * * *